Aug. 23, 1932.     B. A. BENSON     1,873,104
LATCH FOR DUPLEX WAFFLE IRONS
Filed Feb. 13, 1930     2 Sheets-Sheet 1

Inventor:
Bernhart A. Benson
by Albert Scheible
Attorney

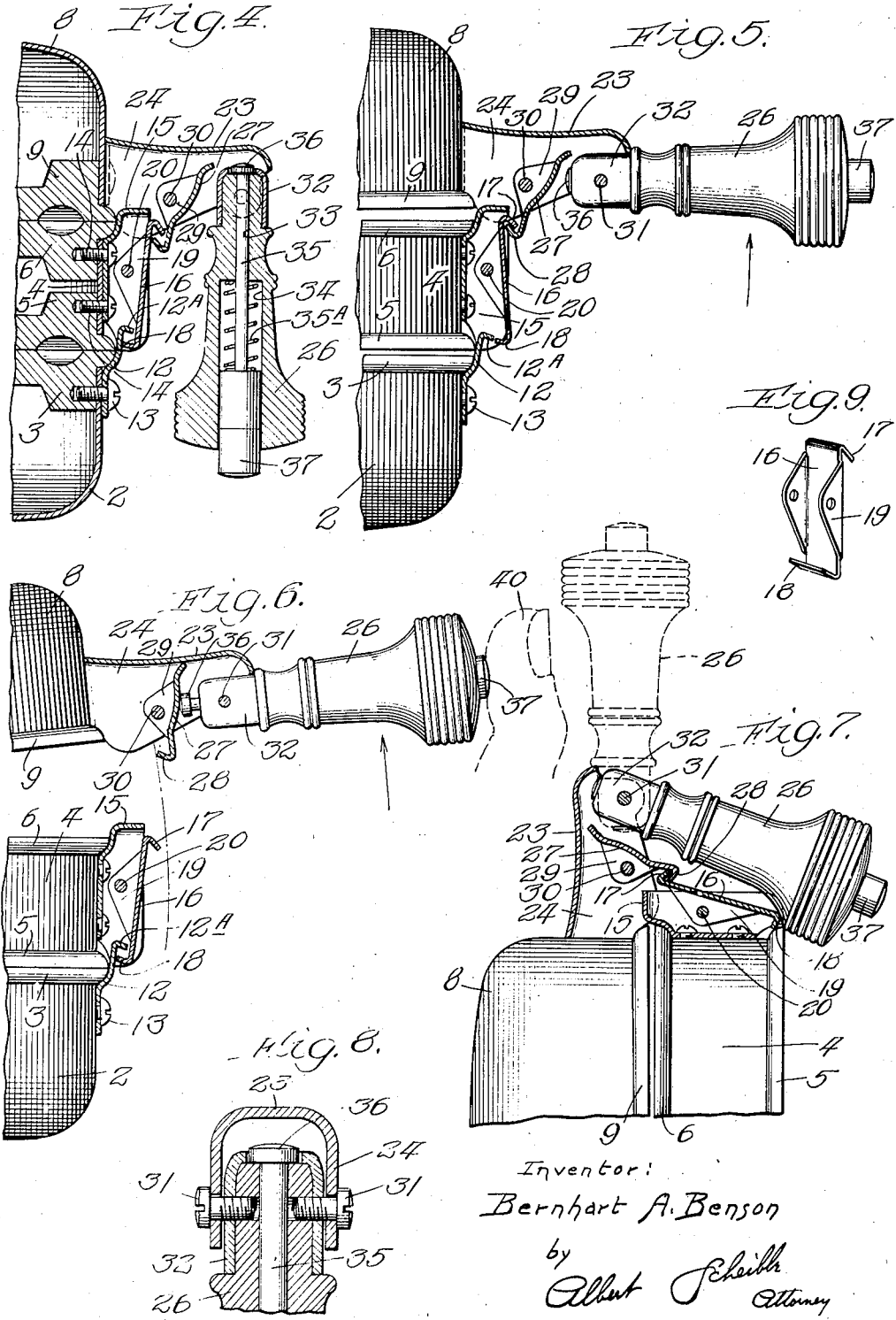
Aug. 23, 1932.  B. A. BENSON  1,873,104
LATCH FOR DUPLEX WAFFLE IRONS
Filed Feb. 13, 1930   2 Sheets-Sheet 2
Inventor:
Bernhart A. Benson Patented Aug. 23, 1932

1,873,104

UNITED STATES PATENT OFFICE

BERNHART A. BENSON, OF CHICAGO, ILLINOIS, ASSIGNOR TO CHICAGO ELECTRIC MANUFACTURING CO., OF CHICAGO, ILLINOIS, A CORPORATION OF ILLINOIS

LATCH FOR DUPLEX WAFFLE IRONS

Application filed February 13, 1930. Serial No. 428,095.

My invention relates to electric waffle irons of the duplex type in which three relatively superposed sections effect the simultaneous baking of one waffle between the bottom section and the intermediate section, and of another waffle between the intermediate section and the top section. In such waffle irons, the three sections are desirably interpivoted to each other on two horizontal and superposed pivot axes, which pivot axes are parallel to each other and extend along one side of the waffle iron, as for example by the duplex pivoting arrangement disclosed in the copending application No. 334,840 of Edward S. Preston, filed January 24, 1929, on a duplex electric waffle iron.

In using such a duplex waffle iron, the two upper sections (namely, the top section and the intermediate section) are desirably swung upward first to permit batter to be poured on the heated grid in the bottom section, which might be done by jointly grasping two handles respectively fastened to the top section and the middle section. But unless the user retains a firm grasp on both handles, which is difficult when the user is also manipulating a heavy pitcher of batter, one of the raised sections may slam down.

Consequently, it is highly desirable that means should be provided for latching the top section to the intermediate or middle section when these two sections are raised together, while also permitting the same sections to be unlatched when the top section is to be raised alone so that batter can be poured for the upper waffle, or so that the baked upper waffle can be removed.

So also, the baked waffles frequently stick to both of the grids between which they are interposed. When this occurs with the upper waffle, a raising of the upper section will also lift both the upper waffle and the middle section until the weight of the middle section pulls the waffle off one of the grids between which it was interposed, whereupon the middle section will slam down on the lower section. All such slamming not only is unpleasant but also may jar the table sufficiently to upset and even break glassware or chinaware, hence it is also highly desirable that the middle section be latched to the bottom section whenever the top section is raised.

Moreover, if the hinging arrangement of the duplex waffle iron is such that the middle section can swing only through an arc of about ninety degrees (or to an approximately upright position), while the top section can swing that much farther so as to dispose the top section in an inverted position, the latching arrangement should permit this also.

In its general objects, my invention aims to provide a simple and effective latching arrangement whereby the above described desirable latching and unlatching can all be accomplished by exceedingly simple manipulations of a single handle and of a single latch-shifting push-button. Furthermore, my invention aims to provide an inexpensive latching arrangement for these purposes, and one which can readily be constructed in such a compact form as not to detract from the appearance of a waffle iron of handsome design.

More particularly, my invention aims to provide a latching arrangement for a waffle iron having three superposed and interhinged sections, which will accomplish the following five purposes by the mere manipulation of a single handle supported by the top section and of a single patch-releasing push-button also associated with the top section, which may have this push-button operating through the single handle:

(1) Simultaneously unlatching the middle section from the bottom section, and latching the middle section to the top section, when the top section is raised by merely lifting the handle.

(2) Latching the middle section to the bottom section when the conjointly raised middle and top sections are returned to their normal positions.

(3) Unlatching the top section from the middle section when the push-button is pressed before the top section is raised by lifting the handle, while latching the middle section to the bottom section during this lifting of the top section alone.

(4) Unlatching the top section from the middle section when the push-button is pressed after these two sections have been conjointly moved to an approximately upright position; so that the top section alone can be swung farther to an inverted position by means of the handle, while leaving the middle section approximately upright.

(5) Automatically latching the top section to the middle section when the top section is swung back from its said inverted position against the approximately upright middle section, so that these two sections can then be swung together down to their normal positions.

Still further and also more detailed objects of my invention will appear from the following specification and from the accompanying drawings, in which Fig. 1 is a side elevation of a duplex electric waffle iron equipped with a latching arrangement embodying my invention, with full lines showing the disposition of all parts when the two upper sections have been raised together, and with dotted lines showing the inverted position of the top section when the latter has been swung about ninety degrees farther.

Fig. 4 is a section taken in a vertical plane diametric of the waffle iron, through the parts shown in Fig. 2.

Fig. 5 is a side elevation of the waffle iron parts shown in Figs. 2 and 4, with the handle swung up to its halted position, and with the latch and latch-supporting portions shown in a vertical section diametric of the waffle iron.

Fig. 6 is a view similar to Fig. 5, but taken after the push-button has been pressed inwardly and the handle has thereafter been lifted for partially raising the top section alone.

Fig. 7 is an enlargement of the upper part of Fig. 1, with the bracket, latch casing and the two movable latch members shown in section, and with dotted lines showing the handle in its extreme raised position.

Fig. 8 is an enlarged and fragmentary vertical section, taken along the line 8—8 of Fig. 2.

Fig. 9 is a perspective view of the main latching member.

Figure 1:
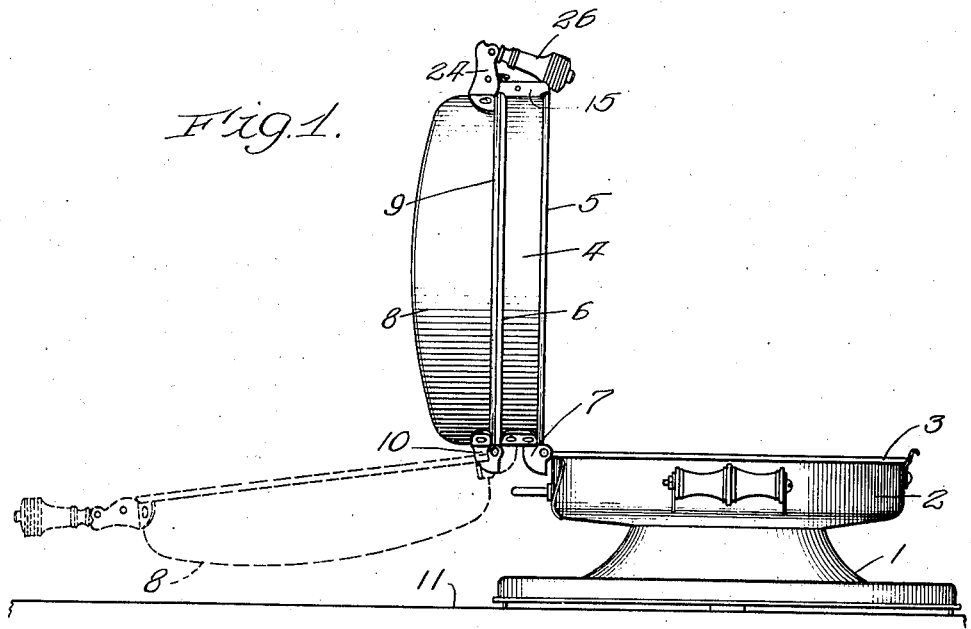

In the illustrated embodiment, my electric waffle iron comprises three hingedly interconnected portions, each of which includes at least one electrically heated baking grid. The bottom or basal section comprises a pedestal-like base 1 (Fig. 1), a bottom casing 2, and a bottom grid 3 supported in the upper portion of this casing. The middle section includes a tubular casing 4 carrying a lower grid 5 and an upper grid 6, and this middle section is hingedly connected to the bottom section by a lower hinge member 7 which permits the middle section to be swung out of its normal horizontal position to the upright position shown in Fig. 1, after the manner more fully disclosed in the said copending application No. 334,840.

The top section includes a dome-like casing 8 having a grid 9 mounted in its lower end. This top section is hingedly connected to the middle section by an upper hinge member 10 which has its hinge axis horizontal, parallel to and above that of the lower hinge member 7. This lower hinged member also is desirably constructed as disclosed in the same copending application, to permit the top section to be swung only about 90 degrees from the middle section, so that the top section can be disposed in an inverted position and freely spaced from the supporting table 11 (as shown in dotted lines in Fig. 1) when the middle section is in an erect position.

For the needed interlatching of the three sections, I provide three latch portions, one being a keeper 12 which is fastened to the bottom section, desirably by one of the same screws 13 which secure the bottom casing 3 to the bottom grid 2. This keeper has its upper end portion bent outwardly and downwardly to afford a hook 12A.

Figure 3:
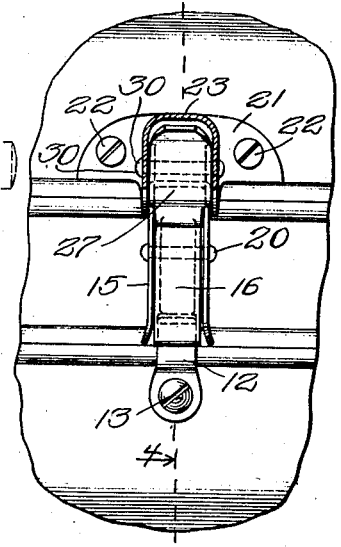
Fig. 3 is a vertical section taken along the line 3—3 of Fig. 2.

Fastened to the middle section (desirably by some of the same screws 14 which secure the tubular middle casing 4 to the grids 5 and 6 of the middle section) is a latch carrier in the form of a latch casing 15 which opens outwardly of the waffle iron and which supports a double-hooked latching member. This latching member (shown separately in Fig. 9) consists of a metal strip 16 having an outwardly directed and downwardly open upper hook 17 formed at its upper end, and having an inwardly directed and upwardly open lower hook 18 at its lower end. The latching member also includes inwardly projecting side wings 19 which fit freely between the sides of the latch casing 15 and which wings are pivoted to these casing sides by a horizontal pivot pin 20, as shown in Figs 3 and 4.

Fastened to and projecting outwardly from the top section of the waffle iron is a bracket (or upper latch carrier) which includes upright feet 21 secured to the top section by screws 22 (Fig. 3), a top 23 which has its outer end portion curved downwardly as in Figs. 4 and 5, and upright sides 24. This bracket serves as the support for two members, both pivoted to it on horizontal axes, namely an upper latch hook and a handle 26. The upper latch hook includes a metal strip 27 having an upwardly and inwardly directed hook end 28 formed at its lower end, and two side wings 29 which extend rearwardly from the strip 27 and fit freely between the sides 24 of the said bracket, to which bracket the upper latch hook is pivoted by a horizontal pin 30 extending through the bracket sides 24 and the latch hook wings 29.

The wing perforations through which the pivot pin 30 extends are spaced sufficiently inward and upward of the waffle iron from the strip portion 27 of the upper latch hook so that gravity normally holds this upper latch hook in the position shown in Fig. 4, in which position the hook end 28 of the upper latch hook underhangs the upper hook 17 of the previously described latching member.

The needed single handle 26 is tubular and has one end extending between the two sides 24 of the said bracket, and this handle end is pivoted to the said bracket sides by screws 31 which have a common horizontal axis and which do not reach into the bore of the handle. To strengthen this end of the handle, I desirably reinforce it by a ferrule 32 through which the pivoting screws extend, as shown in Fig. 8, with the tips of the screws spaced farther apart than the diameter of the handle bore between them.

Extending slidably through the smaller diametered handle bore portion 33 which opens at this reinforced end of the handle is a plunger stem 35 which has a head 36 normally engaging that end of the handle. The other end of the plunger stem is fastened to a push-button 37 which projects beyond the outer end of the handle and which slides in a larger diametered handle bore portion 34. A compression spring 35 interposed between the push-botton 37 and the inner end of the bore portion 34 continuously urges the plunger toward the outer handle end in which the button slides, so as to hold the head 36 normally against the opposite end of the handle from the push-button.

Figure 2:
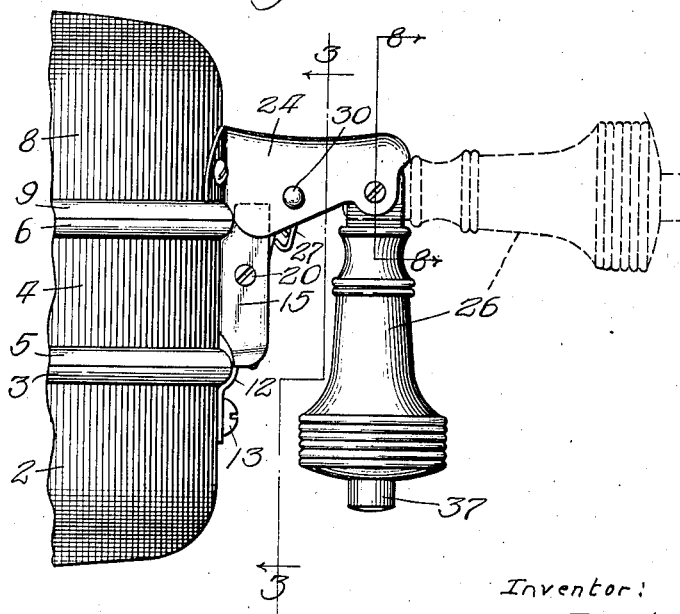
Fig. 2 is an enlarged and fragmentary side elevation, showing the latch parts as they appear when the waffle iron is not in use, or at the beginning of the baking; and with dotted lines showing the extreme position to which the handle can be swung before it begins to raise the top section.

When the three sections of my waffle iron are in their normal superposed positions of Figs. 2 and 4, the handle depends as shown in full lines in these figures, and the hooks at both ends of the latching member which is pivotally mounted in the latch casing fastened to the middle section are disposed for interlocking respectively with keeper 12 and with the hook 28 which depends from the handle-supporting bracket 24.

To raise the top and middle sections conjointly to the erect positions shown in full lines in Fig. 1, the user merely swings the handle outward to its horizontal position of Figs. 5 or 6 (in which position the swing movement of the handle is stopped by the engagement of the handle ferrule 32 with the outer end of the bracket top 23) and then raises the handle still further.

As soon as the handle starts lifting the upper section, the depending hook 28 interlocks with the upper hook 17 of the pivoted latching member, thereby rocking that member (in a direction which is counter-clockwise in Fig. 4) to the position of Fig. 5 in which the lower hook 18 of the latching member clears the hook 12A of the keeper. Consequently, the middle section is raised along with the top section and moves with the latter until the lower hinging member 7 halts the middle section in the erect position of Fig. 1, with the top section still latched to the middle section by the engagement of the upper hook on the middle section with the hook depending from the top section.

When the handle is then released, it swings down by gravity to the horizontal position shown in Figs. 1 and 7 and presses (by gravity) against the normally lower hook 18 of the pivoted latching member, thereby holding the hooks 28 and 17 all the more firmly interlocked. By grasping the handle again and pulling it toward the right (in Fig. 1), the handle swings the two upper sections downward, and these sections are kept continuously interlocked until they are returned to their normal horizontal positions, in which normal positions the seating of the sections on each other spaces the relatively interengageable hook portions from one another vertically as shown in Fig. 4.

If the top section is to be lifted alone, the user first swings the handle to its horizontal bracket-stopped position and then presses the push-button 37 inwardly, so that the head 36 of the plunger rocks the upper hook member in a counterclockwise direction, thereby swinging its hook 28 clear of the upper hook 17 of the pivoted latching member. A continued lifting of the handle (as in Fig. 6) then raises only the top section, while the lower hook 18 of the pivoted latching member (which member also has its pivot axis so disposed with reference to its center of gravity that it tends to swing to the position shown in Fig. 6) underhangs the hook on the keeper 12 and hence prevents the middle section from being lifted along with the top section.

With the parts thus arranged, a single handle supported from the top section suffices for raising the top section either alone or conjointly with the middle section, according to whether or not the push-button was pressed inwardly (as by the finger 40 in Fig. 6), and the raising movement of the handle is the same in either case. Moreover, the middle section is automatically latched to the bottom section when the push-button has been pressed inward for raising the top section alone, and the top section is kept firmly interlocked with the conjointly raised middle section by the action of gravity.

Moreover, the top section can instantly be unlatched from the middle section when both of these sections are in their erect positions of Figs. 1 and 7, by merely raising the handle to the upright position shown in dotted lines in Fig. 7 and then pressing the push-button inwardly of the handle to release the upper hook member from the adjacent hook of the pivoted latching member. This permits the top section to be swung further by means of the handle to the inverted position shown in dotted lines in Fig. 1, thereby exposing all of the grid faces so that they can easily be cleaned.

Since simple stampings suffice for the keeper, the latching member, the upper hook member and the handle-supporting bracket, my entire latching and manipulating arrangement is quite inexpensive. Moreover, all of the needed parts can be of such relatively small size as not to detract from the appearance of the waffle iron as a whole.

In shaping the upper hook member, I desirably form the back 27 so that it will be engaged by the plunger head 36 at a point above the axis of the plunger, so as to affect the desired rocking of the hook member by operation of the push-button. This may be done by rounding both the said back 27 and the end of the plunger head, as shown in Fig. 6. I also preferably make the said back 27 of such a length that it will engage the top 23 of the bracket to stop the plunger-actuated rocking of the upper hook member, as illustrated in Fig. 6, thereby informing the user when the push-button has been pressed inwardly to a sufficient extent, and also preventing the upper hook member from flopping too far over.

However, while I have heretofore described my invention in an embodiment including many desirable details of construction and arrangement, I do not wish to be limited in these respects, since many changes might be made without departing either from the spirit of my invention or from the appended claims, nor do I wish to be limited to the employment of my invention in a multi-sectional appliance for baking waffles, since a similar arrangement could be used with equal advantages if the grids were formed for baking superposed griddle cakes, doughnuts or the like.

I claim as my invention:

1. A waffle iron comprising three normally horizontal and relatively superposed and electrically heated sections, namely a bottom, a middle, and a top section; pivoting means at one side of the waffle iron for interhinging the sections, and latching means at the opposite side of the waffle iron for releasably latching the middle section to both the bottom section and the top section, the latching means including two latch carriers respectively fast upon the top section and the middle section; the said carriers laterally interfitting each other when the top and the middle section are interlatched, so as to prevent relative rotational movement of the top and middle sections about the vertical axis of the waffle iron.

2. A waffle iron comprising three normally horizontal and relatively superposed sections interhinged at one side on horizontal axes, and means for selectively latching the middle section to the top and bottom sections, the said means comprising a latch hook depending from and pivotally mounted on the top section, and a latching member pivoted to the middle section on a horizontal pivot axes and having its upper end formed with a hook freely overhanging the hook portion of the latch hook when the top section is seated on the middle section, the said pivot axis being above, and inward of the waffle iron from the center of gravity of the latching member, whereby gravity continuously tends to hold the latching member in its said disposition when the top section is seated on the middle section.

3. In an electric waffle iron having relatively superposed bottom, middle and top sections interhinged on horizontal axes at one side of the waffle iron, and latching means comprising: a latch hook depending from and pivotally mounted on the top section at the opposite side of the waffle iron, the latch hook having an upwardly open hook formation at its lower end; a keeper fast on the bottom section and having a downwardly open hook formation at its upper end, and a single generally upright latching member pivotally connected intermediate its ends to the middle sections on a horizontal axis and having a hook at each end; the latching member being movable from one to another of two positions, in the first of which its upper hook overhangs the hook formation on the latch hook, and in the second of which its lower hook underhangs the hook formation on the keeper.

4. A waffle iron construction as per claim 3, in which the pivot axis of the latching member is above and inward of the waffle iron from the center of gravity of the latching member, whereby gravity normally holds the latching member in its said first position; in combination with an operating member movable for forcing the latching lever from its first to its second position, and a spring normally holding the operating member out of its said lever forcing disposition.

5. A waffle iron including three superposed sections and two means at one side of the waffle iron for pivoting the middle section respectively to the top and bottom sections on superposed horizontal axes; two latch hooks respectively mounted on the top and bottom sections; a single intermediate latching member movably mounted on the middle section for movement to and from two positions in which the intermediate latching member interlocks respectively with one and the other of the said latch elements; a handle on the top section, and means operably by a hand grasping the handle for controlling the position of the latching member.

6. A waffle iron construction as per claim 3, including a latch carrier fast on the top section and to which the latch hook is pivoted, the latch hook having a portion thereof disposed for engaging a part of the said latch carrier to limit the rocking of the latch hook in one direction.

7. A waffle iron construction as per claim 3, including a latch carrier fast on the top section and to which the latch hook is pivoted, the carrier having vertical sides extending substantially radially of the waffle iron, a handle having a stem extending between the said sides, means for pivoting the handle to the latch carrier on a horizontal axis, a plunger slidably extending through the handle and adapted to engage the latch hook when the plunger is slid inwardly, and a spring resisting the inward sliding of the plunger.

8. A waffle iron including three superposed sections and pivoting means disposed at one side of the waffle irons for permitting movement of each upper section on a horizontal axis with respect to the bottom section; a latch carrier extending outwardly from the top section at the opposite side of the waffle iron from the pivoting means, a keeper on the bottom section at the same side as the latch carrier; a latch hook supported by the latch carrier; a latching member pivotally supported upon the intermediate section and having oppositely directed hook formations respectively adapted to engage the latch hook and the keeper; means pivoting the latching member to the said intermediate section on a horizontal axis farther inward of the waffle iron than the center of gravity of the latching member, whereby gravity normally holds the latching member disposed for engaging only the said keeper, and latch shifting means movably supported by the latch carrier for moving the latching member out of its normal keeper engaging disposition and into engaging relation with the hook.

9. A waffle iron as per claim 8, including a handle pivoted at its upper end to and normally depending from the bracket, the bracket having a portion disposed for engaging the handle to limit the outward swing of the handle substantially to a horizontal position; the handle having a portion thereof adapted to bear by gravity against the latching member when the top and middle sections are both swung to a substantially upright position, so as to hold the latching member in a position in which one of its hook formations is interlocked with the said latch hook, thereby maintaining the interlocking of the top and middle sections when both thereof are in substantially upright positions.

10. A waffle iron as per claim 8, in which each section includes a grid, and in which the latching member is supported by a latch carrier from the intermediate section; the latch member, latch carrier and keeper being respectively fastened to grids of the three sections on which they are mounted.

11. A waffle iron as per claim 5, including a bracket-like member fast upon the top section, to which member the handle is pivoted and from which member the handle normally depends, the said member having a stop portion adapted to be engaged by the handle when the handle is swung upwardly, whereby a further raising of the handle will lift the top section also.

12. A baking appliance comprising three relatively superposed sections consecutively pivoted to each other at the same side of the appliance, and means at the opposite side of the appliance for selectively latching the middle section to either the bottom or the top section, the said means including a latching member movably supported by the middle section and normally latching the middle section to the bottom section, and a control member movably mounted upon the top section and actuable for moving the latching member to unlatch the middle section from the bottom section and to latch the middle section to the top section.

13. A baking appliance as per claim 12, including a handle carried by the top section, the control member being disposed for actuation by the hand grasping the handle.

Signed at Chicago, Illinois, January 27th, 1930.

BERNHART A. BENSON.